UNITED STATES PATENT OFFICE.

FREDERICK E. WOODWARD, OF LACHINE, QUEBEC, CANADA.

SHOE-FILLER.

1,136,459.     Specification of Letters Patent.     Patented Apr. 20, 1915.

No Drawing.     Application filed August 8, 1913. Serial No. 783,796.

*To all whom it may concern:*

Be it known that I, FREDERICK E. WOODWARD, a citizen of the United States of America, and residing at No. 577 St. Joseph street, Lachine, Province of Quebec, Dominion of Canada, have invented certain new and useful Improvements in Shoe-Fillers, of which the following is a specification.

The invention to be hereinafter described relates to shoe fillers.

The main objects of the invention are to provide a marketable, transportable filler which will be economical in its production and use and will have the following qualities; permanent pliability, durability, waterproofness, elasticity, resiliency, softness and workability, strongly adherent to leather whether wet or dry, tenacious, low melting, quick cooling, rapid setting and stable or nonshifting.

At present there are two classes of fillers on the market—rubber cement fillers, and ground cork fillers. Neither of these adequately meets the demands. The first is dangerous from fire and is wasteful and expensive because of evaporation, while the second requires a long time to set, involving long and expensive delays in the other steps of manufacture.

To fully and adequately meet all of the requirements hereinbefore enumerated the present filler has been invented. It comprises the ingredients hereinafter stated, and mixed substantially in the manner and proportions set forth in the following description. Preferably, what will be hereinafter termed the compound, is first made. This compound, which also performs the function of a binder, is then mixed with a base of ground or granulated cork, sawdust, leather dust, or any suitable substance of like nature.

The preparation of the above filler is as follows:—16 lbs. of resin is put into a steam jacketed kettle or other suitable vessel and heated until melted; into this is stirred 1 lb. of pine tar; then 4 lbs. of pontianac resin (resin obtained by deresinating pontianac), 4 lbs. resin oil, 8 lbs. of solid petrolatum, and 10 lbs. of bi-carbonate of soda are added in the order named, each being thoroughly incorporated in the hot fluid mass before the next is added. Into every 5 gals. of this compound or mixture thoroughly incorporated 25 lbs. of the base material. When allowed to cool this filler is ready for use. If desired it may be molded into cakes or blocks while warm and then allowed to cool in such shape for more convenient handling. This filler is absolutely non-inflammable due, chiefly, to omission of waxes and inclusion of bi-carbonate of soda. The heated compound and consequently, the filler containing it, gives off a non-inflammable gas, thus substantially preventing combustion of the filler. Thus, in addition to the qualities previously enumerated, this filler has the additional qualities of non-inflammableness and smoothness and evenness in working when being molded into the cavity.

Omission of the bi-carbonate of soda, while detracting from the non-inflammable quality of the filler, yet leaves a filler of good marketable qualities, possessing all of the other enumerated characteristics.

The ingredients above named are common trade articles and, therefore, vary more or less in purity. Consequently, their proportions will vary somewhat, on that account. Likewise, the requirements of the filler for use in summer are different than the requirements for winter. For that reason, the proportions will be varied. Thus, for winter use, for instance, there would be a greater quantity of oil than for summer use.

Obviously, other ingredients having either individually or collectively, similar properties may be used for those specifically mentioned. Many of these are well known on the market and would readily occur to any one skilled in the art to which this invention relates. Therefore, they need not be set forth here.

Having fully set forth and described my invention, what I claim and desire to protect by Letters Patent of the United States is:—

1. A shoe filler containing a resinous gum, resin, resin oil, pine tar, solid petrolatum, and a comminuted resilient solid material.

2. A shoe filler consisting of a resinous gum 4 lbs. resin oil 4 lbs. resin 16 lbs. pine tar 1 lb. solid petrolatum 8 lbs. bi-carbonate of soda 10 lbs., and a comminuted resilient solid material.

3. A shoe filler consisting of a resinous gum 4 lbs.; resin oil 4 lbs.; resin 16 lbs., pine tar 1 lb. solid petrolatum 8 lbs., bi-carbonate of soda 10 lbs., and a comminuted resilient solid material in the proportion of 25 lbs., of comminuted resilient solid material to 5 gals. of said mixture.

Signed this 31st day of July 1913. in the presence of two witnesses.

FREDERICK E. WOODWARD.

Witnesses:
  GEORGE H. CROSS,
  RICHARD E. WOODWARD.